United States Patent
West et al.

(10) Patent No.: US 11,545,748 B2
(45) Date of Patent: Jan. 3, 2023

(54) ULTRA-WIDEBAND CIRCULAR BEAMFORMER

(71) Applicant: Rockwell Collins, Inc., Cedar Rapids, IA (US)

(72) Inventors: James B. West, Cedar Rapids, IA (US); Russell D. Wyse, Center Point, IA (US); Jiwon L. Moran, Marion, IA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/464,242

(22) Filed: Sep. 1, 2021

(65) Prior Publication Data
US 2021/0399418 A1     Dec. 23, 2021

Related U.S. Application Data

(63) Continuation of application No. 16/709,106, filed on Dec. 10, 2019, now Pat. No. 11,139,570.

(51) Int. Cl.
*H04L 27/00* (2006.01)
*H01Q 3/26* (2006.01)
(Continued)

(52) U.S. Cl.
CPC ............ *H01Q 3/2694* (2013.01); *H01Q 3/28* (2013.01); *H01Q 5/25* (2015.01)

(58) Field of Classification Search
CPC ......... H04L 1/0618; H04L 1/06; H04Q 25/00; H04Q 3/267; H04Q 5/25; H04Q 1/36;
(Continued)

(56) References Cited

U.S. PATENT DOCUMENTS 6,965,349 B2    11/2005    Livingston et al.
8,743,015 B1     6/2014    West et al.
(Continued)

FOREIGN PATENT DOCUMENTS

EP    3494614 A1    6/2019
EP    3506212 A1    7/2019
EP    3825964 A2    5/2021

OTHER PUBLICATIONS

Chien Wei et al.: "3D Beamforming Techniques for Indoor UWB Wireless Communications", 2019 IEEE International Conference of Intelligent Applied Systems on Engineering (ICIASE). IEEE, Apr. 26, 2019 (Apr. 26, 2019), pp. 98-100, XP033760471, DOI: 10.1109/ICIASE45644.2019.9074048 [retrieved on Apr. 20, 2020] *abstract*.

(Continued)

*Primary Examiner* — Khai Tran
(74) *Attorney, Agent, or Firm* — Suiter Swantz pc llo

(57) ABSTRACT

An ultra-wideband (UWB) beam forming system is disclosed. In one or more embodiments, the UWB beam forming system includes a plurality of radiating elements forming a circular, cylindrical, conical, spherical, or multi-faceted array and a beamformer coupled to the radiating elements. The beamformer includes one or more transformable reconfigurable integrated units (TRIUNs) configured to independently control individual radiating elements or groups of radiating elements of the plurality of radiating elements.

14 Claims, 12 Drawing Sheets

(51) Int. Cl.
*H01Q 5/25* (2015.01)
*H01Q 3/28* (2006.01)

(58) Field of Classification Search
CPC ... H04Q 3/2605; H04Q 3/2682; H04B 7/0669
USPC ...................................................... 375/299
See application file for complete search history.

(56) References Cited

U.S. PATENT DOCUMENTS

| | | | |
|---|---|---|---|
| 9,225,073 | B2 | 12/2015 | Culkin et al. |
| 9,923,270 | B1 | 3/2018 | Little et al. |
| 10,224,627 | B2 | 3/2019 | Carey et al. |
| 10,324,166 | B2 | 6/2019 | West et al. |
| 11,024,974 | B2* | 6/2021 | Jamaly .................... H01Q 9/40 |
| 2006/0058606 | A1 | 3/2006 | Davis et al. |
| 2015/0236411 | A1 | 8/2015 | Garrett et al. |
| 2016/0275719 | A1 | 9/2016 | Oke |
| 2017/0040702 | A1 | 2/2017 | West et al. |
| 2018/0108986 | A1 | 4/2018 | Whelan et al. |
| 2019/0131704 | A1 | 5/2019 | Urzhumov |
| 2020/0106477 | A1* | 4/2020 | Nanni ...................... H04B 3/52 |
| 2020/0153096 | A1* | 5/2020 | Henry ................... H01P 5/1022 |
| 2020/0153121 | A1* | 5/2020 | Jamaly .................... H01Q 1/52 |
| 2020/0170601 | A1 | 6/2020 | Gagnon et al. |
| 2020/0178088 | A1 | 6/2020 | Lo et al. |
| 2020/0333431 | A1 | 10/2020 | Völkel |
| 2021/0175621 | A1 | 6/2021 | West et al. |

OTHER PUBLICATIONS

Chien-Hung Chen et al.: "Novel Directional Radiation Pattern by Genetic Algorithms in Indoor Wireless Local Loop", Wireless Personal Communications, Kluwer Academic Publishers, DO, vol. 42, No. 4, Oct. 27, 2006 (Oct. 27, 2006), pp. 575-586, XP019535205, ISSN: 1572-834X, DOI: 10.1007/S11277-006-9212.9 *Section 2.2*.
Claus Scheiblauer et al: "Out-of-core selection and editing of huge point clouds", Computers and Graphics, Elsevier, GB, vol. 35, No. 2, Jan. 7, 2011 (Jan. 7, 2011), pp. 342-351, XP028164982, ISSN: 0097-8493, DOI: 10.1016/J.CAG.2011.01.004 [retrieved on Jan. 20, 2011].
Extended Search Report for European Application No. 20209885.1 dated May 21, 2021, 9 pages.
Extended Search Report for European Application No. 20213218.9 dated Apr. 30, 2021, 12 pages.
Fickenscher Jorg et al: "Cell-based update algorithm for occupancy grid maps and hybrid map for ADAS on embedded GPUs", 2018 Design, Automation & Test in Europe Conference & Exhibition (Date), EDAA, Mar. 19, 2018 (Mar. 19, 2018), pp. 443-448, XP033333894, DOI: 10.23919/DATE.2018.8342050 [retrieved on Apr. 19, 2018].
Markus Schuetz et al: "Potree: Rendering Large Point Clouds in Web Browsers", Sep. 19, 2016 (Sep. 19, 2016), XP055388659, Faculty of Informatics, Technical University Vienna, AUTRetrieved from the Internet: URL:https://publik.tuwien.ac.at/files/publik_252607.pdf [retrieved on Jul. 6, 2017].
Neinhua SM et al.: "Finite impulse response-filter-based RF-beamforming network for wideband and ultra-wideband antenna arrays", IET Microwaves Antennas & Propagation, vol. 5, No. 7, May 13, 2011 (May 13, 2011), pp. 844-851, XP006038649, ISSN: 1751-8733, DOI: 10.1049/IET-MAP:20100302 *Sections 1,3,4,5*.
Youn HS et al.: "Design of a Cylindrical Long-Slot Array Antenna Integrated With Hybrid EBG/Ferrite Ground Plane", IEEE Antennas and Wireless Propagation Letters, IEEE, Piscataway, NJ. US, vol. 11, Jan. 1, 2012 (Jan. 1, 2012), pp. 180-183, XP011489139, ISSN: 1536-1225, DOI: 10.1109/LAWP.2012.2186782 *abstract* *Sections II, IV*.

* cited by examiner

ULTRA-WIDEBAND CIRCULAR BEAMFORMER

CROSS-REFERENCE TO RELATED APPLICATIONS

The present application is a Continuation of U.S. application Ser. No. 16/709,106, titled ULTRA-WIDEBAND CIRCULAR BEAMFORMER, filed Dec. 10, 2019, which is incorporated herein by reference in the entirety.

BACKGROUND

Narrowband circular and cylindrical Active Electronically Array (AESA) Beamformers (BF) with both omnidirectional (omni) and directional modes are extremely challenging to implement.

The directional mode requires a circular commutating switching network where only about one third of the cylindrical/circular surface is illuminated at any time. The one third active ("tuned on") arc of radiating elements must commutate 360° in azimuth, and the entire Tx/Rx RF power needs to be optimally routed to the one third active arc. Amplitude tapering is required for optimal side lobe levels within the azimuth plane, and differential phase shift is required to steer the directional beam in the azimuth plane about the directional beam's nominal boresight.

The omnidirectional mode of the circular array requires all elements to be illuminated. Cylindrical array phase mode theory allows both amplitude tapering and non-uniform differential phase excitation of adjacent elements for optimal omnidirectional performance as a function of array radius. Cylindrical arrays require an additional amplitude tapering and differential phase implementation in addition to those described above—in the vertical plane.

Historically, it has been impractical to simultaneously meet all of these conditions. Ultra-wide Band (UWB) BFs are even more challenging as they require: time delay (TD) for beam steering and pattern shaping, with is more complicated to hardware implement than the modulo-360° phase shift needed for narrow band systems; and low amplitude ripple in a circular UWB array's omnidirectional mode is a strong function of array radius, as is commonly known in the literature. Furthermore, for optimal UWB omnidirectional mode performance, an adjustable or "elastic" array radius is required, which is impossible to implement within a "static" array lattice configuration. Cylindrical arrays also required time delay for beam steering in the orthogonal, elevation plane. It is also desirable to implement the above concepts in conical arrays.

Traditional "discrete" active Radio Frequency (RF) circuits are problematic in terms of beamformer (BF) hardware implementation because: they are too physically large for higher microwave (μwave)/millimeter wave (mmWave) array BF topologies since typically half-wave element spacing is used to prevent grating lobes (aka parasitic beams); circuit layout compaction due to array radiating element lattice spacing constraints can cause heat flux density/thermal management problems within the BF; and a dual omni/directional mode circular/cylindrical array BF will have a very dense set of RF, DC and digital control signal paths which further exacerbates the packaging and interconnect density challenges within the BF.

UWB simultaneous, independently steered multi-beams in azimuth (and/or elevation) are also difficult to realize in contemporary technology due to the requirement of parallel "banking" of duplicate BFs, with one BF per each beam.

There is a need for an UWB, miniature BF Architecture that incorporates reconfigurable RF signal path switching with commensurate combining/splitting, along with adjustable channel amplitude and TD is required to improve the existing BF architecture.

SUMMARY

An ultra-wideband (UWB) beam forming system is disclosed. In one or more embodiments, the UWB beam forming system includes a plurality of radiating elements forming a circular, cylindrical, conical, spherical, or multi-faceted array and a beamformer coupled to the radiating elements. The beamformer includes one or more transformable reconfigurable integrated units (TRIUNs) configured to independently control individual radiating elements or groups of radiating elements of the plurality of radiating elements. Using one or more TRIUNs to implement and n-channel switch and/or a n-way splitter/combiner allows for miniaturization and simplification of the beamformer network, which is very difficult to do with passive transmission lines.

In some embodiments of the UWB beam forming system, the one or more TRIUNs are configured to turn on or off selected radiating elements of the plurality of radiating elements.

In some embodiments of the UWB beam forming system, the one or more TRIUNs are configured to control amplitude parameters for selected radiating elements of the plurality of radiating elements.

In some embodiments of the UWB beam forming system, the one or more TRIUNs are configured to control time delay parameters for selected radiating elements of the plurality of radiating elements.

In some embodiments of the UWB beam forming system, the one or more TRIUNs are configured to control phase parameters for selected radiating elements of the plurality of radiating elements.

In some embodiments of the UWB beam forming system, the one or more TRIUNs are configured to generate an omnidirectional radiation pattern by turning on the plurality of radiating elements and applying different time delays or phase shifts or amplitude adjustments to different radiating elements or groups of radiating elements to produce different omnidirectional wave fronts.

In some embodiments of the UWB beam forming system, the one or more TRIUNs are configured to generate a directional radiation pattern by turning on a selected group of radiating elements that form an arc of the circular, cylindrical, conical, spherical, or multi-faceted array and turn off other radiating elements that form a remainder of the circular, cylindrical, conical, spherical, or multi-faceted array.

In some embodiments of the UWB beam forming system, the one or more TRIUNs are further configured to generate intra-sector, steered directional radiation patterns by applying different time delays or phase shifts or amplitude adjustments to different radiating elements within the selected group of radiating elements.

In some embodiments of the UWB beam forming system, the one or more TRIUNs are further configured to generate two-dimensional or three-dimensional radiation patterns by turning on one or more radiating elements in at least one other plane than the selected group of radiating elements that form the arc of the circular, cylindrical, conical, spherical, or multi-faceted array.

In some embodiments of the UWB beam forming system, the plurality of radiating elements arranged in the circular, cylindrical, conical, spherical, or multi-faceted array are one set of multiple sets of radiating elements forming multiple rings with different radii.

In some embodiments of the UWB beam forming system, the one or more TRIUNs are configured to turn on or off selected radiating elements of a selected set of radiating elements to generate a directional or omnidirectional radiation pattern emanating from a selected ring of radiating elements with a selected radius.

In some embodiments of the UWB beam forming system, the multiple sets of radiating elements forming the multiple rings with different radii are tiered or staggered.

In some embodiments of the UWB beam forming system, the beamformer comprises a cross bar beamformer configured to generate multiple, independently steered radiation patterns across multiple sectors of the circular, cylindrical, conical, spherical, or multi-faceted array.

In some embodiments of the UWB beam forming system, the cross bar beamformer is configured to generate the multiple, independently steered radiation patterns simultaneously in Azimuth and elevation.

In some embodiments of the UWB beam forming system, the beamformer is configured in a mixer-based transceiver topology with local oscillator (LO) or intermediate frequency (IF) phase shifting.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
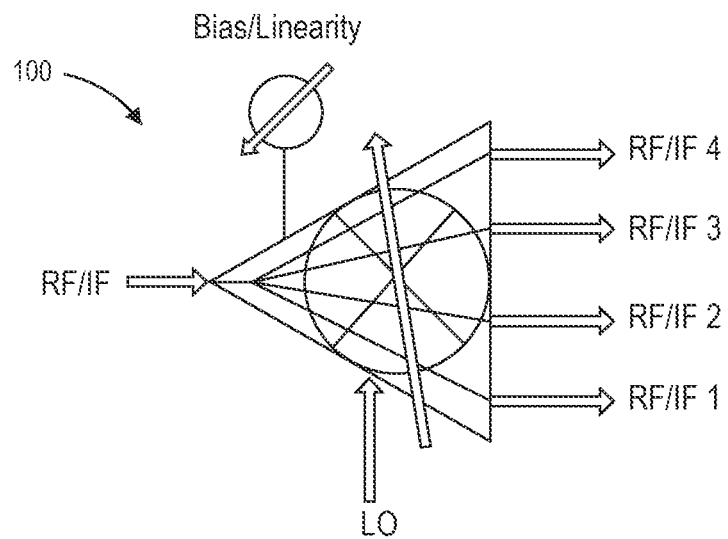
FIG. 1A is a block diagram illustrating a transformable reconfigurable integrated unit (TRIUN), in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An ultra-wideband (UWB) beam forming system is disclosed. In embodiments, the UWB beam forming system includes a beamformer (BF) capable of simultaneously realizing a "n-channel" parallel RF switching network that can be reconfigured into a "n-way" combiner and/or splitter through the use of transformable reconfigurable integrated units (TRIUNs).

TRIUNs may be implemented by the "multiple mode RF circuits" described in U.S. Pat. Nos. 8,660,514 and 8,963,612, which are incorporated herein by reference in their entireties. TRIUN hardware has been demonstrated in SiGe BiCMOS RFIC technology, but its circuit topology can be realized in numerous RFIC foundry processes, such Gallium Arsenide (GaAs), Gallium Nitride (GaN), Indium Phosphine, (InP), and other existing or forthcoming integrated circuit foundry technologies.

TRIUN technology can also be combined with Frequency Enhanced Active Topologies (FEAT) to create higher gain/bandwidth/linearity capable devices for enhanced RF performance. FEAT technology is described in U.S. Pat. No. 9,444,418, which is also incorporated herein by reference in its entirety.

The use of TRIUNs to realize a "n-channel" parallel RF switching network that can be reconfigured into a "n-way" combiner and/or splitter enables simultaneous directional and omnidirectional BF modes. In an omnidirectional mode, all array elements may be activated (e.g., turned on) with the specific amplitude and time delay (or phase). In a directional mode, one or more TRIUNs may be configured as a n-channel RF commutating switch for directional modes by activating only the "⅓ active arc" of the array.

Furthermore, the incorporation of inter-channel level amplitude and time delay (or phase shifting) allows UWB beam steering and dynamic array pattern synthesis for circular, cylindrical, conical and multifaceted planar conformal AESA arrays. For circular, cylindrical and conical arrays, the omnidirectional mode ripple performance can be optimized by switching between selective radiating elements (or subsets of multiple elements) to dynamically grow and shrink the effective array radius as a function of frequency.

Multi-beam operation can be realized through radio-frequency integrated circuit (RFIC) embodiments of UWB cross bar beamformers. UWB cross bar beamformers are described in U.S. patent application Ser. No. 16/280,573, "Multibeam Cross Bar Electronically Scanned Array, Filed Feb. 20, 2019, which is incorporated herein by reference in its entirety.

Previous attempts to implement a circular, cylindrical, conical, spherical, or multi-faceted array UWB beamformer have had several drawbacks. For example, directional mode circular, cylindrical, conical, spherical, or multi-faceted array AESAs rely on discrete RF switching networks that tend to be large and complicated, or they may rely on organ pipe electromechanical scanners that are narrow band, large, heavy, and have lower Mean Time Between Failure (MTBF). Omnidirectional mode circular, cylindrical, conical, spherical, or multi-faceted array AESAs rely on passive n-way splitters for fixed omnidirectional mode, which are not as good as single UWB omnidirectional antennas and lack mechanisms for optimizing omnidirectional mode ripple for UWB circular arrays. Using a butler matrix for dual omni/directional modes achieves multiple beams but narrower band, and fine beam pointing granularity or implementing a large number of beams creates overly complex circuit topologies. Super Heterodyne (SuperHet)-based hybrid digital beam forming (DBF) suffers from narrow IF instantaneous bandwidths, and direct DBF has poor SWAP-C, thermal management and untenable digital pipe/data transfer requirements relative to other modern technologies.

The UWB beam forming systems disclosed herein can help overcome many of the problems encountered by previous attempts to implement a circular, cylindrical, conical, spherical, or multi-faceted array UWB beamformer. The disclosed systems enable an UWB RF circular, cylindrical and conical array AESA beamformer that can realize and simultaneously optimizes both directional and omnidirectional modes of operation in a reconfigurable fashion. In embodiments, the UWB beam forming systems described herein may achieve/include: multifaceted planar AESA beamformer architectures to enable 360° azimuthal coverage; intra-sector single beam, electronic beam steering; circular and conical AESA architectures whose effective array radius dynamically changes as a function of frequency to minimize omnidirectional amplitude ripple, and implement circular array phase mode theory, in an UWB fashion; simultaneous and independently steered intra-sector beams—both 1D and 2D independently steered beams—by the integration of 1D and 2D cross bar beamformer BF sub-architectures with the dual mode omni/directional BFs; LO based and/or IF based phase shifting architectures incorporated into the dual mode BF concepts; hybrid (IF sampled) or Direct Sampled Digital Beamforming can also be the horizontal (orthogonal to the first scan plane) to enable 2D beam scanning; and 3D & 2D arrays with complex 3D RF interconnects that can be realized by additive manufacturing processes (e.g., 3D printing, or the like).

Figure 1B:
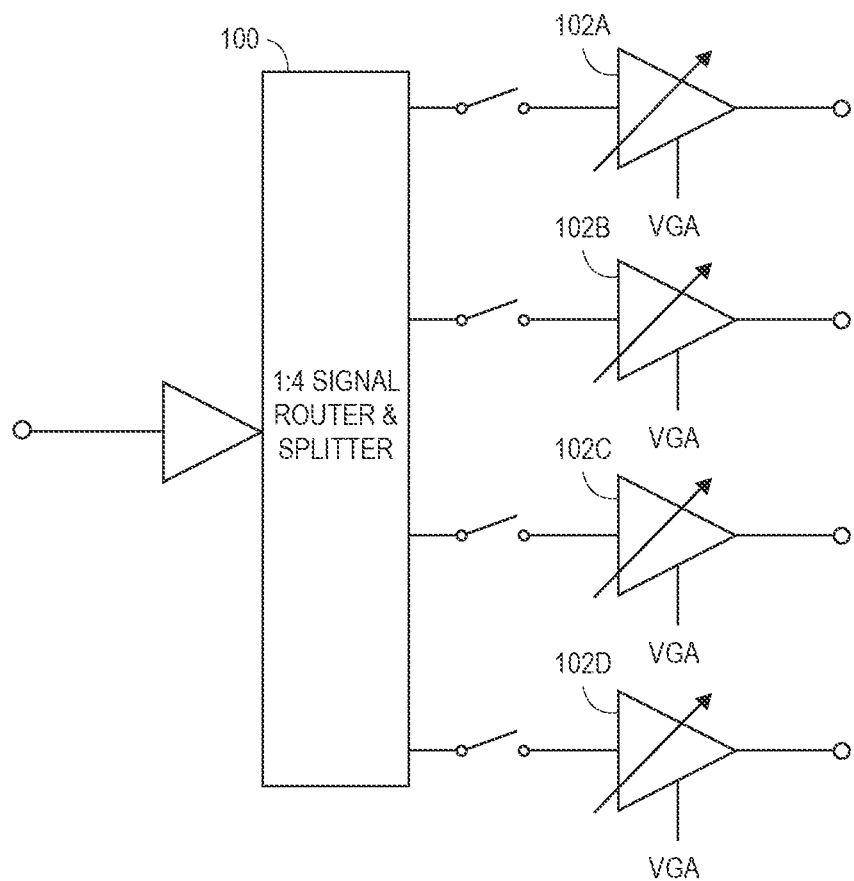
FIG. 1B is a block diagram illustrating a n-channel switch and n-way splitter implemented by one or more TRIUNs, in accordance with one or more embodiments of this disclosure.

FIG. 1A illustrates the circuit symbol representation of a TRIUN 100 Splitter, and FIG. 1B shows a lower level embodiment of TRIUN 100 when it is configured to be in "amplifier" mode with VGA and routing capabilities. This configuration of 100 can functionality be represented as an initial amplifier with n-channel passive splitter followed by independent switches and VGAs on each RF output path.

The TRIUN 100 RFIC functions as a reconfigurable splitter and n-way switch with gain control. Variable gain amplifiers (VGAs) 102 are shown for each channel. The TRIUN circuit topology is a key enabler for an UWB simultaneous omni/directional mode circular array BF.

Figure 1C:
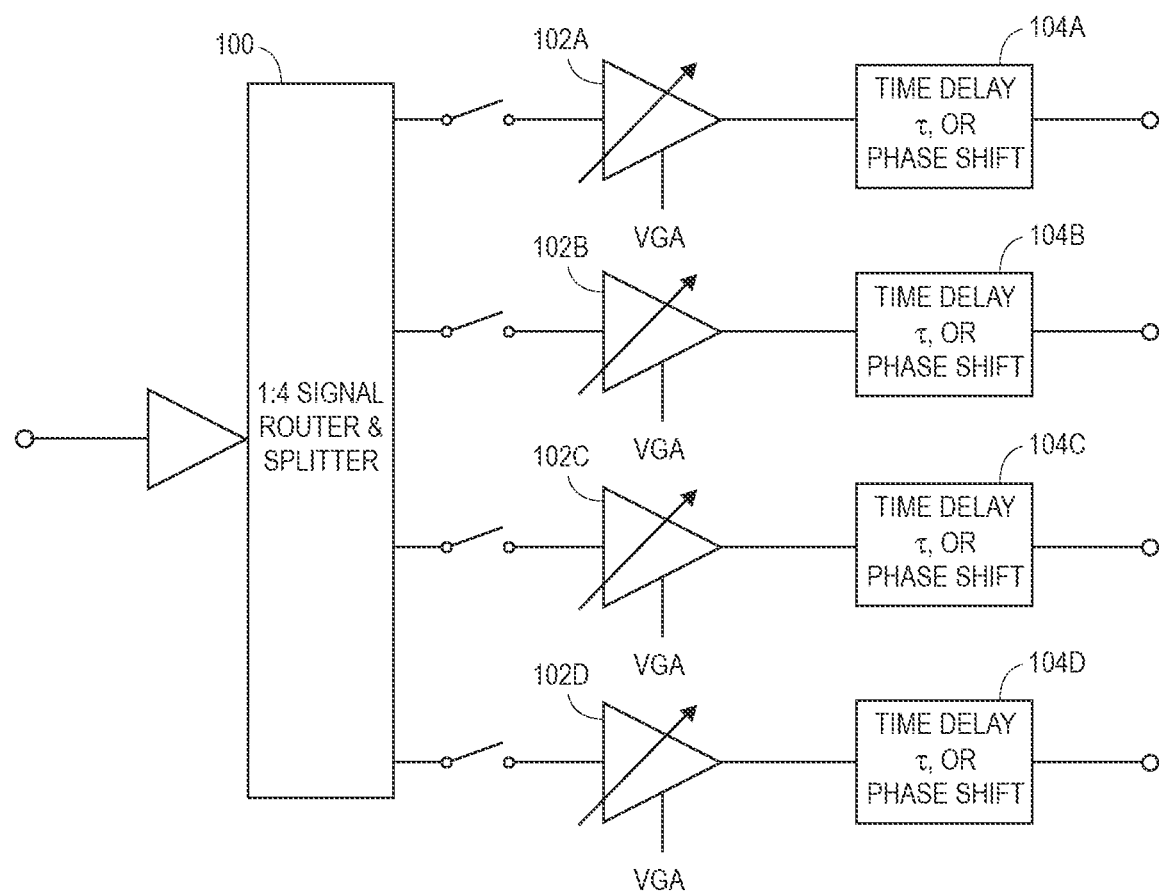
FIG. 1C is a block diagram illustrating a n-channel switch and n-way splitter implemented by one or more TRIUNs, with integrated beam steering, in accordance with one or more embodiments of this disclosure.

FIG. 1C illustrates another example embodiment of a n-channel Switch and n-way splitter implemented by a TRIUN 100 (for a 4-channel example). In this embodiment, the circuit further include a time delay and/or phase shift block 104 for each channel. The radiation pattern/beam emitted by an AESA can steered by controlling the time delay and/or phase shift of each channel. This is a key enabler for inter-sector beam steering for a UWB circular array BF in the directional mode.

Although 4 channels are shown in the example embodiments illustrated in FIGS. 1B and 1C, more (or less) than 4 channels are possible. Circuit element non-idealities is what will ultimately limit the number of parallel channels that may be implemented. Furthermore, in some embodiments, multiple TRIUNs 100 may be cascaded to implement a higher number of parallel channels.

Embodiments and example implementations of an UWB beam forming system that includes TRIUN circuit topology are illustrated in FIGS. 2 through 9C and are described below.

Figure 2:
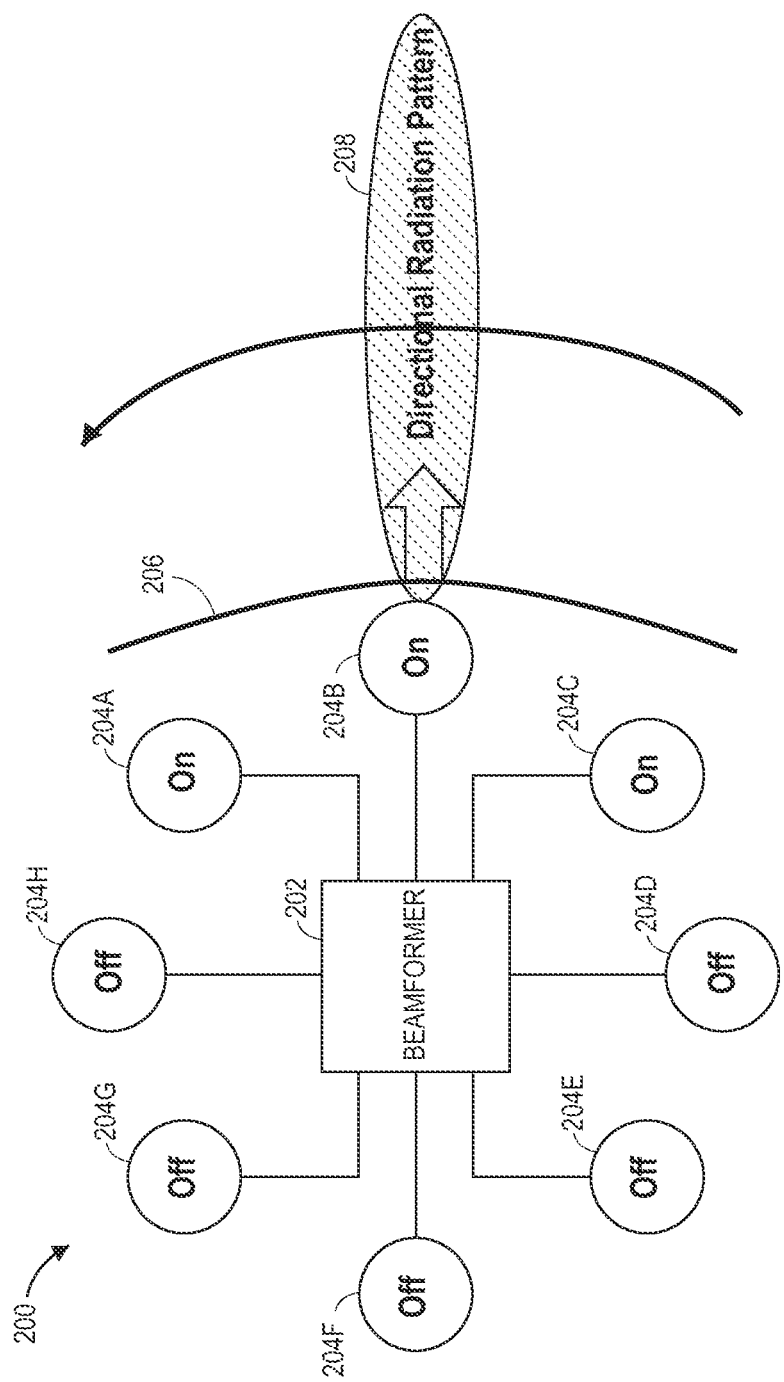
FIG. 2 is a block diagram illustrating a circular array beamforming (BF) system operable in a directional mode, in accordance with one or more embodiments of this disclosure.

FIG. 2 illustrates a circular array UWB beam forming system 200 configured for directional mode operability. In embodiments, the UWB beam forming system 200 includes a plurality of radiating elements 204 forming a circular (or cylindrical array) and a beamformer 202 coupled to the radiating elements 204. The beamformer 202 includes one or more TRIUNs 100 configured to independently control individual radiating elements 204 or groups of radiating elements 204. For example, the beamformer 202 may include one or more TRIUNs 100 configured as a n-channel switch and/or n-way splitter/combiner (e.g., as shown in FIG. 1B or 1C).

The one or more TRIUNs 100 of the beamformer 202 may be configured to turn on or off selected radiating elements 204. In some embodiments, the one or more TRIUNs 100 of the beamformer 202 may be further configured to control amplitude parameters for selected radiating elements 204. In some embodiments, the one or more TRIUNs 100 of the beamformer 202 may be further configured control time delay and/or phase parameters for selected radiating elements 204.

As shown in FIG. 2, the one or more TRIUNs 100 of the beamformer 202 may be configured to generate a directional radiation pattern 208 by turning on a selected group of radiating elements 204 (e.g., elements 204A, 204B, and 204C) that form an arc 206 of the circular, cylindrical, conical, spherical, or multi-faceted array and turning/keeping off other radiating elements (e.g., elements 204D-204H) that form a remainder of the circular, cylindrical, conical, spherical, or multi-faceted array. In this regard, only the forward arc of radiating element 204 is energized. Here, the beamformer 202 may be configured in a commutating switch mode to energize selected radiating elements 204, while leaving others turned off. In embodiments, the active segment (arc 206) commutates for 360° Azimuthal directional beam coverage.

Figure 3:
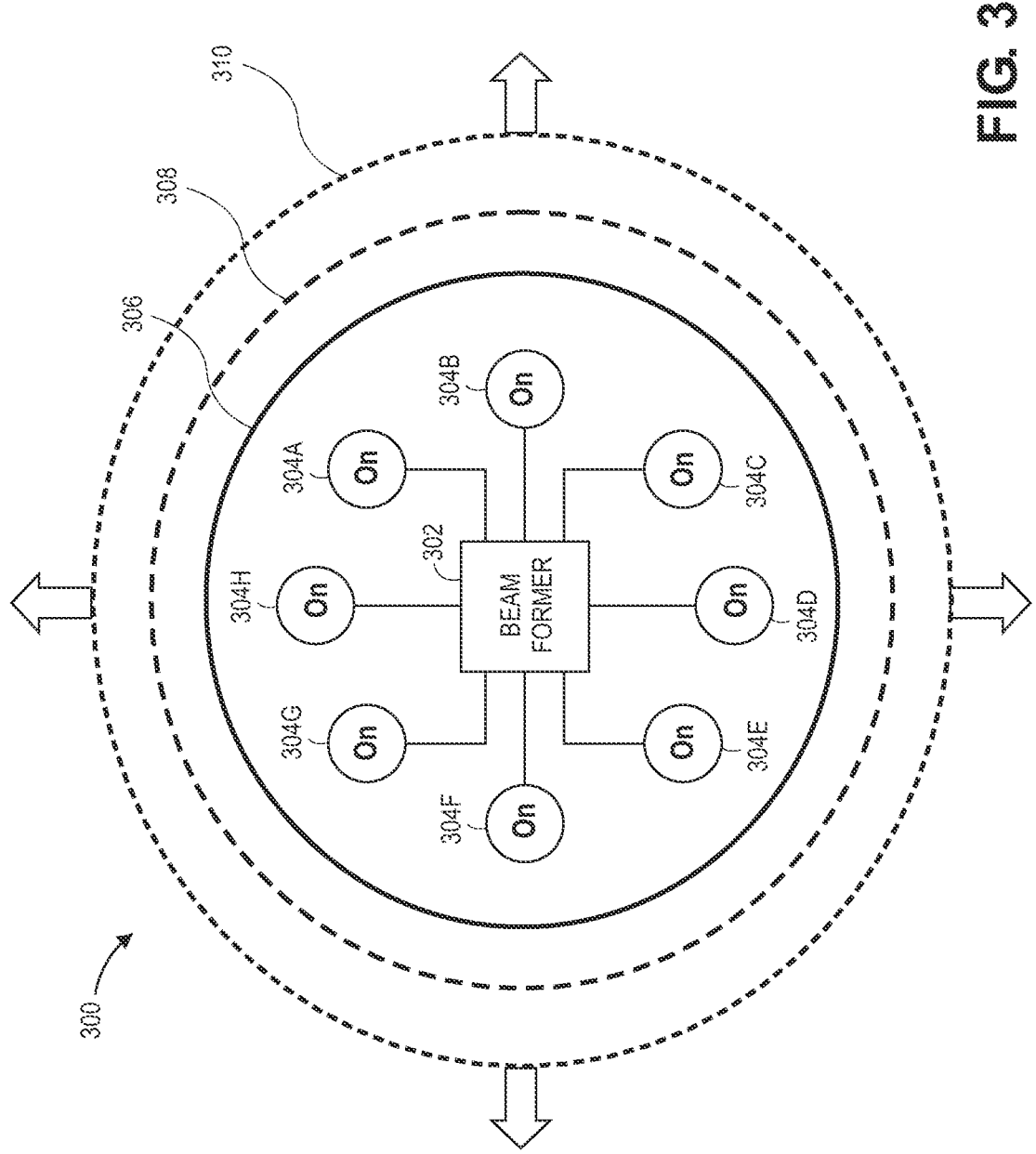
FIG. 3 is a block diagram illustrating a circular array BF system operable in an omnidirectional mode, in accordance with one or more embodiments of this disclosure.

FIG. 3 illustrates a circular array UWB beam forming system 300 configured for omnidirectional mode operability. In some embodiments, the UWB beam forming system 300 and system 200 are the same system, operable in both directional and omnidirectional modes. However, to avoid confusion, different numbering is used herein when discussing each of FIGS. 2 and 3.

In embodiments, the UWB beam forming system 300 includes a plurality of radiating elements 304 forming a circular (or cylindrical array) and a beamformer 302 coupled to the radiating elements 304. The beamformer 302 includes one or more TRIUNs 100 configured to independently control individual radiating elements 304 or groups of radiating elements 304. For example, the beamformer 302 may include one or more TRIUNs 100 configured as a n-channel switch and/or n-way splitter/combiner (e.g., as shown in FIG. 1B or 1C).

The one or more TRIUNs 100 of the beamformer 302 may be configured to turn on or off selected radiating elements 304. In some embodiments, the one or more TRIUNs 100 of the beamformer 302 may be further configured to control amplitude parameters for selected radiating elements 304. In some embodiments, the one or more TRIUNs 100 of the beamformer 302 may be further configured control time delay and/or phase parameters for selected radiating elements 304.

As shown in FIG. 3, the one or more TRIUNs 100 of the beamformer 302 may be configured to generate an omnidirectional radiation pattern by turning on all the radiating elements 304 and applying different time delays or phase shifts to different radiating elements 304 or groups of radiating elements 304 to produce different omnidirectional wave fronts (e.g., wave fronts 306, 308, 310, etc.). In this regard, all the radiating elements 304 are energized in the omnidirectional mode. However, each radiating element 304 may have a controlled relative time delay (per circular array phase mode theory) and/or a different amplitude.

Wave fronts 306, 308, and 310 illustrate transmission (Tx) mode omnidirectional wave fronts emanating away from the AESA, each of progressively different propagation delay/phase shift. The same principles may apply to receiving (Rx) mode omnidirectional reception. Here, the beamformer 302 may be configured in a n-way splitter/combiner mode to energize all the radiating elements 304 simultaneously.

Figure 4:
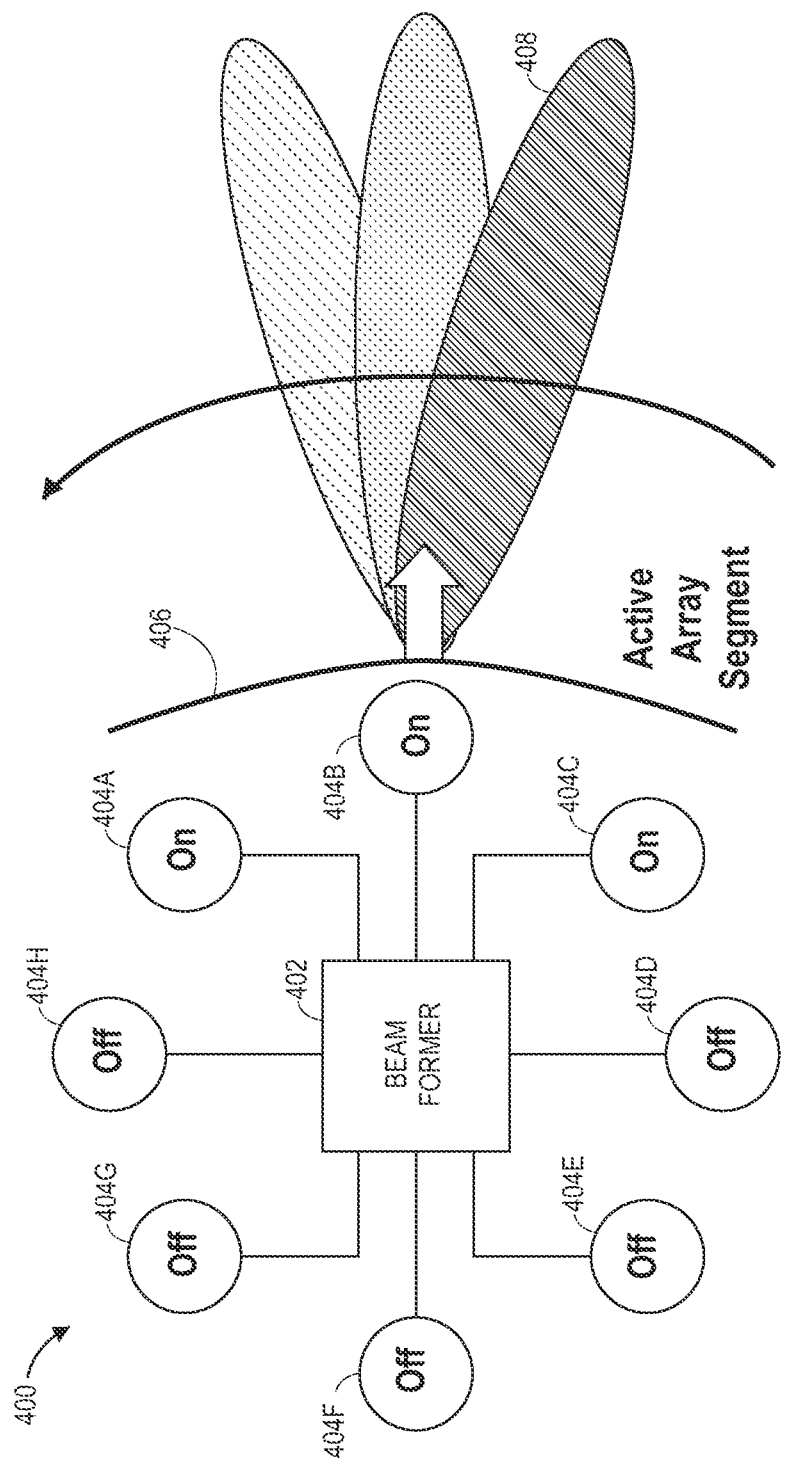
FIG. 4 is a block diagram illustrating a circular array BF system operable in a directional mode with sector beam scanning, or a top view of a cylindrical array BF system operable in a directional mode with two-dimensional (2D) beam steering, in accordance with one or more embodiments of this disclosure.

FIG. 4 illustrates a circular array UWB beam forming system 400 configured for directional mode operability with sector beam scanning and/or 2D beam steering. In some embodiments, the UWB beam forming system 400 and system 200/300 are the same system, operable in both directional and omnidirectional modes. However, to avoid confusion, different numbering is used herein when discussing each of FIGS. 2, 3, 4.

In embodiments, the UWB beam forming system 400 includes a plurality of radiating elements 404 forming a circular (or cylindrical array) and a beamformer 402 coupled to the radiating elements 404. The beamformer 402 includes one or more TRIUNs 100 configured to independently control individual radiating elements 404 or groups of radiating elements 404. For example, the beamformer 402 may include one or more TRIUNs 100 configured as a n-channel switch and/or n-way splitter/combiner (e.g., as shown in FIG. 1B or 1C).

As shown in FIG. 4, the one or more TRIUNs 100 of the beamformer 402 may be configured to generate a directional radiation pattern 408 by turning on a selected group of radiating elements 404 (e.g., elements 404A, 404B, and 404C) that form an arc 406 of the circular, cylindrical, conical, spherical, or multi-faceted array and turning/keeping off other radiating elements (e.g., elements 404D-404H) that form a remainder of the circular, cylindrical, conical, spherical, or multi-faceted array. In this regard, only the forward arc of radiating element 404 is energized. Here, the beamformer 402 may be configured in a commutating switch mode to energize selected radiating elements 404, while leaving others turned off. In embodiments, the active segment (arc 406) commutates for 360° Azimuthal directional beam coverage. The one or more TRIUNs 100 of the beamformer 400 may be further configured to generate intra-sector, steered directional radiation patterns 408 by applying different time delays or phase shifts to different radiating elements 404 within the selected group of radiating elements (e.g., by applying different time delays or phase shifts to elements 404A, 404B, and 404C).

In some embodiments, the one or more TRIUNs of the beamformer 400 are configured to generate 2D or 3D radiation patterns by turning on one or more radiating elements in at least one other plane than the selected group of radiating elements that form the arc of the circular, cylindrical, conical, spherical, or multi-faceted array. For example, FIG. 4 may represent a top view of a cylindrical array in a 2D directional AESA embodiment with 360° Azimuthal coverage. In such embodiments, linear arrays or subarrays of the cylindrical array of radiating elements 404 have local beamformers 402 configured to apply time delays or phase shifts to generate 2D/3D steered beams. Each of the "elements" in the diagram are now linear, or more generally subarrays, which also allow a second dimension of beam scanning out of the plane illustrated in FIG. 4. Time delay or phase shifting may be incorporated both in the horizontal plane and the vertical subarrays to enable 2D beam scanning within a cylindrical, conical or multi-faceted planar array structure. In some embodiments, hybrid (IF sampled) or Direct Sampled Digital Beamforming can also be in the horizontal plane (orthogonal to the first scan plane) to enable 2D beam scanning. 2D and 3D arrays have complex 3D RF interconnects that can be realized by additive manufacturing processes (e.g., 3D printing).

Figure 5:
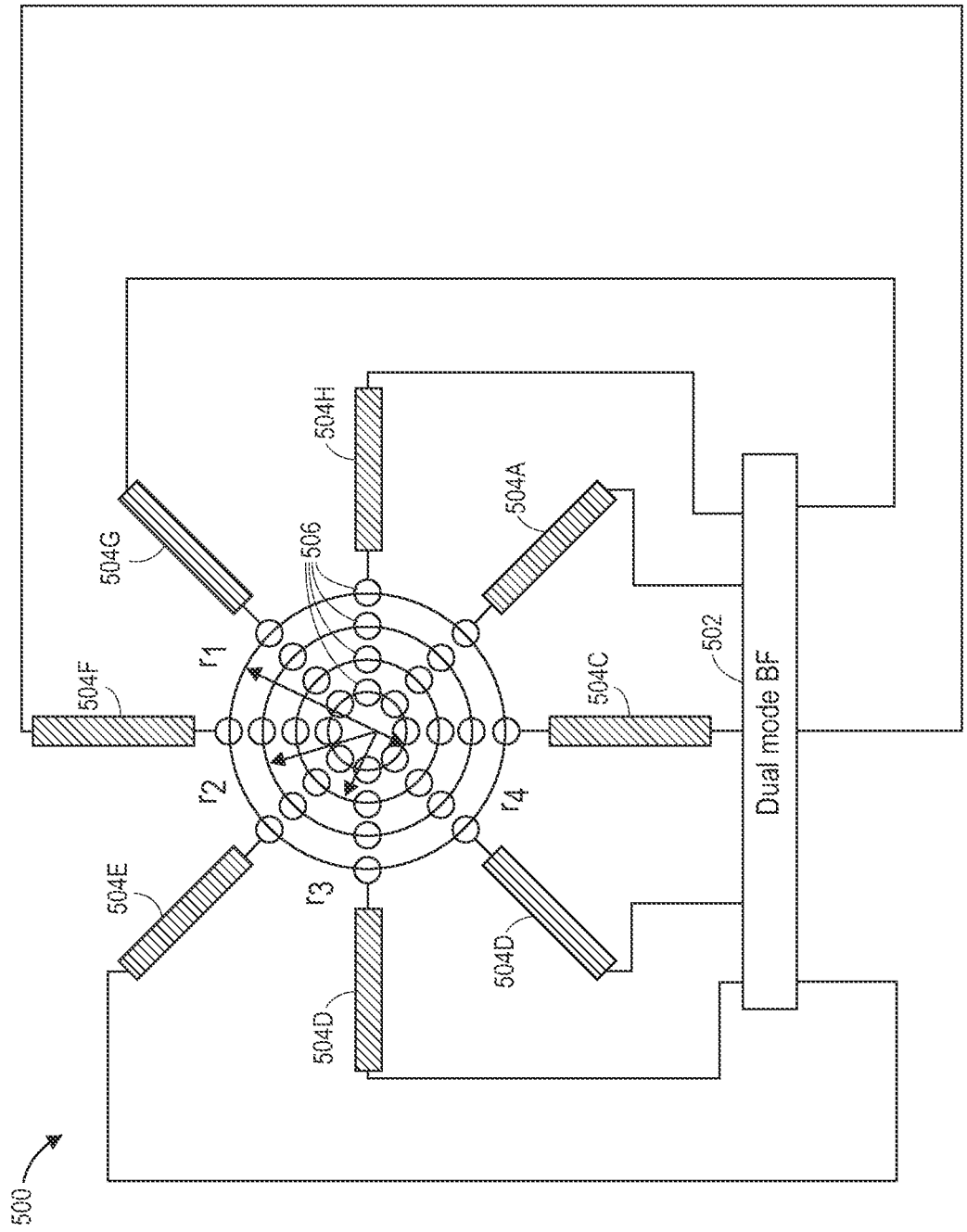
FIG. 5 is a block diagram illustrating a multiple array BF system operable in a directional or omnidirectional mode, in accordance with one or more embodiments of this disclosure.

FIG. 5 illustrates a multiple array UWB beam forming system 500 configured for directional and omnidirectional modes. FIG. 5 may illustrate two different topologies: 1) a planar circular array of dynamically changing array radius; or 2) a stepped cylindrical, quantized 3D pyramid. It is also possible for the system 500 illustrated in FIG. 5 to be a cylindrical array configuration of end fire radiating elements, such as planar TEM horn/BAA/Vivaldi elements, e.g., if the elements in the concentric rings are staggered form another within a vertical slice of the cylindrical array to give each individual radiating element an unobstructed Field of View (FOV) as possible.

In FIG. 5, the circular array beam forming concept has been extended to optimizing omnidirectional modes utilizing a plurality of linear arrays of radiating element 506 that form multiple rings with different radii. The UWB beam forming system 500 includes at least one beamformer 502 coupled to the radiating elements 506. The beamformer 502 may include or may be coupled to n-channel switches 504 that connect the beamformer 502 to the radiating element 506.

In embodiments, the beamformer 502 includes one or more TRIUNs 100 configured to independently control individual radiating elements 506 or groups of radiating elements 506. For example, the beamformer 502 may include one or more TRIUNs 100 configured as a n-channel switch and/or n-way splitter/combiner (e.g., as shown in FIG. 1B or 1C). Some or all of the n-channel switches 504 may also implemented by one or more TRIUNs 100, either as part of the beamformer 502 or as separate components that are coupled to the beamformer 502.

As shown in FIG. 5, UWB beam forming system 500 includes multiple sets of radiating elements 506 forming multiple rings with different radii (e.g., radii r1, r2, r3, r4, etc.). In some embodiments, the one or more TRIUNs 100 of the beamformer 502 are configured to turn on or off selected radiating elements 506 of a selected set of radiating elements 506 to generate a directional or omnidirectional radiation pattern emanating from a selected ring of radiating elements 506 with a selected radius (e.g., from radiating elements 506 within a ring having radius r1, r2, r3, or r4). For example, the active array radius may be selected as a function of frequency to optimize omnidirectional ripple performance. The radius of the circular array (or cylindrical, conical, etc.) may be dynamically adjusted to optimize the omni-mode performance in accordance to circular array phase mode design theory.

In some embodiments, the multiple sets of radiating elements 506 forming the multiple rings with different radii are tiered or staggered to reduce radiation blockage. For example, the arrays may be stacked in a conical/pyramid configuration so that each ring is at a different elevation, or the arrays may be staggered so that the radiating elements 506 are not radially aligned with one another. An alternative architecture is to have radial log periodic linear arrays whose phase centers are designed to migrate away from the array center as a function of frequency to minimize UWB omnidirectional mode ripple. Dynamic array radius adjustment minimizes UWB omnidirectional mode ripple.

Figure 6:
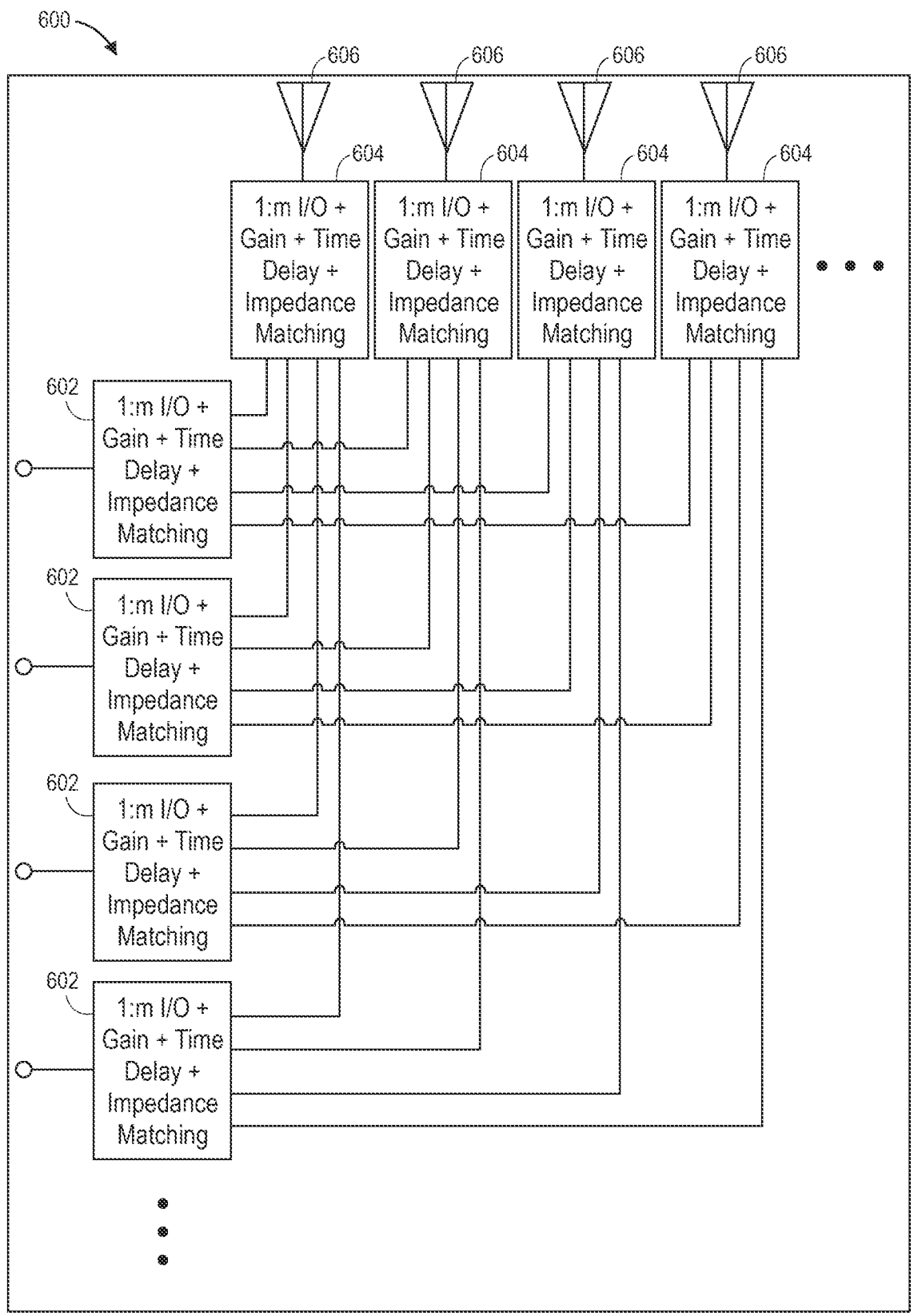
FIG. 6 is a block diagram illustrating an integrated crossbar BF system operable in a directional or omnidirectional mode, in accordance with one or more embodiments of this disclosure.

In FIG. 6, the UWB beamforming concepts described herein are further extended to simultaneous multiple, independently steered beams in Azimuth (or elevation) with an integrated cross bar beamformer 600. As shown in FIG. 6, the cross bar beamformer 600 includes synchronized gain/shifter blocks 602 and 604 set up in row/column architecture to generate P beams across Q antenna structures 606. For example, in the illustrated example embodiment, P=4 and Q=4 for conceptual simplicity; however, P and Q can be arbitrary. The antenna structures 606 can be single elements, subarrays, linear arrays, planar arrays, conformal arrays, etc., and can be configured for 1D and/or 2D beam scanning. Directional and omnidirectional modes are also enabled.

In embodiments, the linearly aligned antenna structures 606 that are shown in FIG. 6 may be conformed to the perimeter of circular, cylindrical, conical, spherical, or multi-faceted array array structures. Then, P beams can be generated for any of the commutated active circular arcs of the circular array. Additionally, multiple cross bar beamformers 600 can be driven by a dual mode omni/directional beamformer (e.g., beamformer 502) as previously described herein. As a result, numerous directional beams covering a 360° FOV are possible; or, the multiple beams can be collapsed to a single omnidirectional mode radiation pattern.

Figure 7:
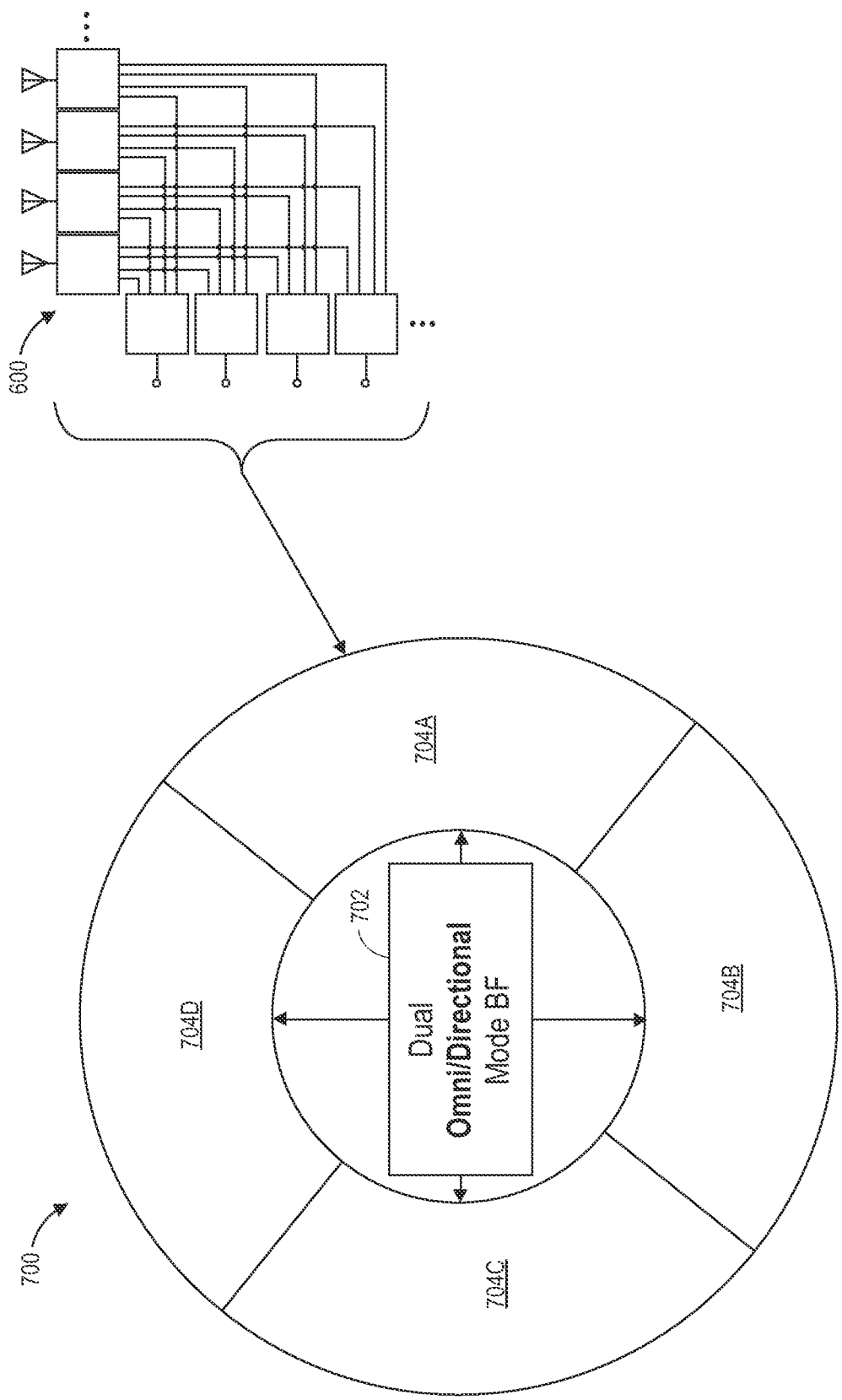
FIG. 7 is a block diagram illustrating a circular, cylindrical, conical, spherical, or multi-faceted array multiple integrated crossbar BF system operable in a directional or omnidirectional mode, with simultaneous, independently steered beams in Azimuth or elevation, where the crossbar beamformer is configured to control individual radiating elements, in accordance with one or more embodiments of this disclosure.

FIG. 7 illustrates a multiple array UWB beam forming system 700 configured for directional and omnidirectional modes with simultaneous multiple, independently steered beams in Azimuth or elevation utilizing one or more integrated cross bar beamformers 600. In the embodiment illustrated in FIG. 7, the one or more cross bar beamformers 600 are integrated within sectors 704 of a circular, cylindrical, conical, spherical, or multi-faceted array. A dual omni/directional mode beamformer 702 includes one or more TRIUNs 100 configured to drive the one or more cross bar beam formers 600 in the sectors 704 of the circular, cylindrical, conical, spherical, or multi-faceted array in order to independently control individual radiating elements or groups of radiating elements (e.g., antenna structures 606). For example, the beamformer 702 may include one or more TRIUNs 100 configured as a n-channel switch and/or n-way splitter/combiner (e.g., as shown in FIG. 1B or 1C). In this regard, the beamformer 702 comprises a cross bar beamformer 600 configured to generate multiple, independently steered radiation patterns across multiple sectors 704 of the circular, cylindrical, conical, spherical, or multi-faceted array.

In some embodiments, the cross bar beamformer 600 is configured to generate the multiple, independently steered radiation patterns simultaneously in Azimuth and elevation. For example, omnidirectional modes may include single beam omnidirectional radiation patterns, or a plurality of directional beams displaced about 360° of Azimuth FOV. Hybrid (IF sampled) or Direct Sampled Digital Beamforming can also be implemented in the horizontal plane (orthogonal to the first scan plane) to enable 2D beam scanning.

Figure 8:
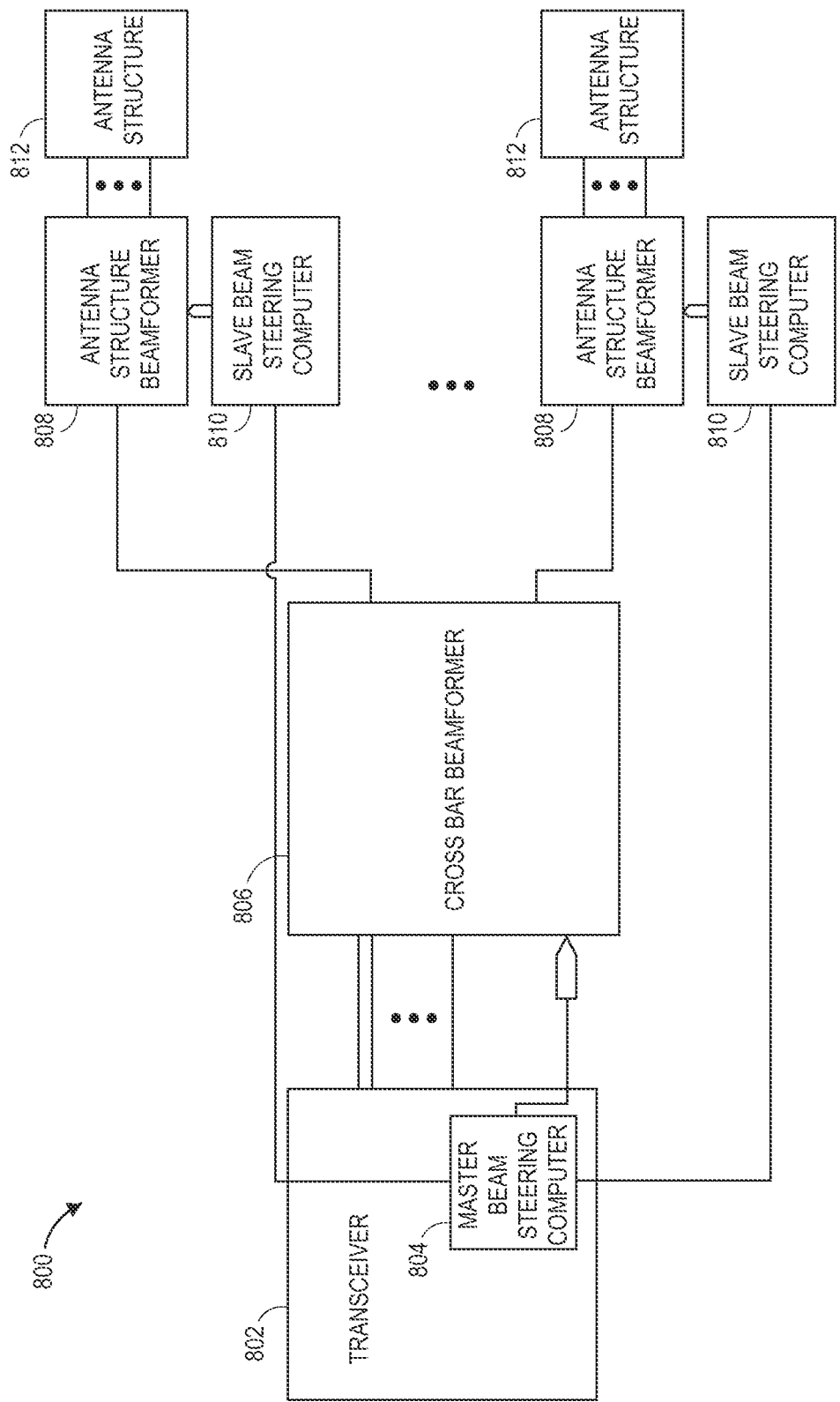
FIG. 8 is a block diagram illustrating a circular, cylindrical, conical, spherical, or multi-faceted array multiple integrated 2D crossbar BF system operable in a directional or omnidirectional mode, with simultaneous, independently steered beams in Azimuth and elevation, where a first (e.g., crossbar) beamformer is configured to control sub-arrays of radiating elements by controlling the respective beamformers of the sub-arrays, in accordance with one or more embodiments of this disclosure.

FIG. 8 illustrates a multiple array UWB beamforming system 800 configured for directional and omnidirectional modes with simultaneous multiple, independently steered beams in Azimuth or elevation utilizing integrated 2D cross bar beamformers 600 (e.g., cross bar beamformers 806 and 808—in some embodiments, beamformer 806 may be another type of beamformer). In embodiments, the UWB beam forming system 800 includes a transceiver 802 with a master beam steering computer 804 configured to control cross bar beam former 806 and further configured to control one or more slave beam steering computers 810 that control antenna structure (second) beamformers 808. The antenna structure beam formers 808 are configured to drive the antenna structures 812 (e.g., radiating elements). This architecture can be adapted to circular, cylindrical, conical and multifaceted planar structures, as based on the concepts previously discussed herein. Hybrid (IF sampled) or Direct Sampled Digital Beamforming can also be implemented in the horizontal plane (orthogonal to the first scan plane) to enable 2D beam scanning.

Figure 9A:
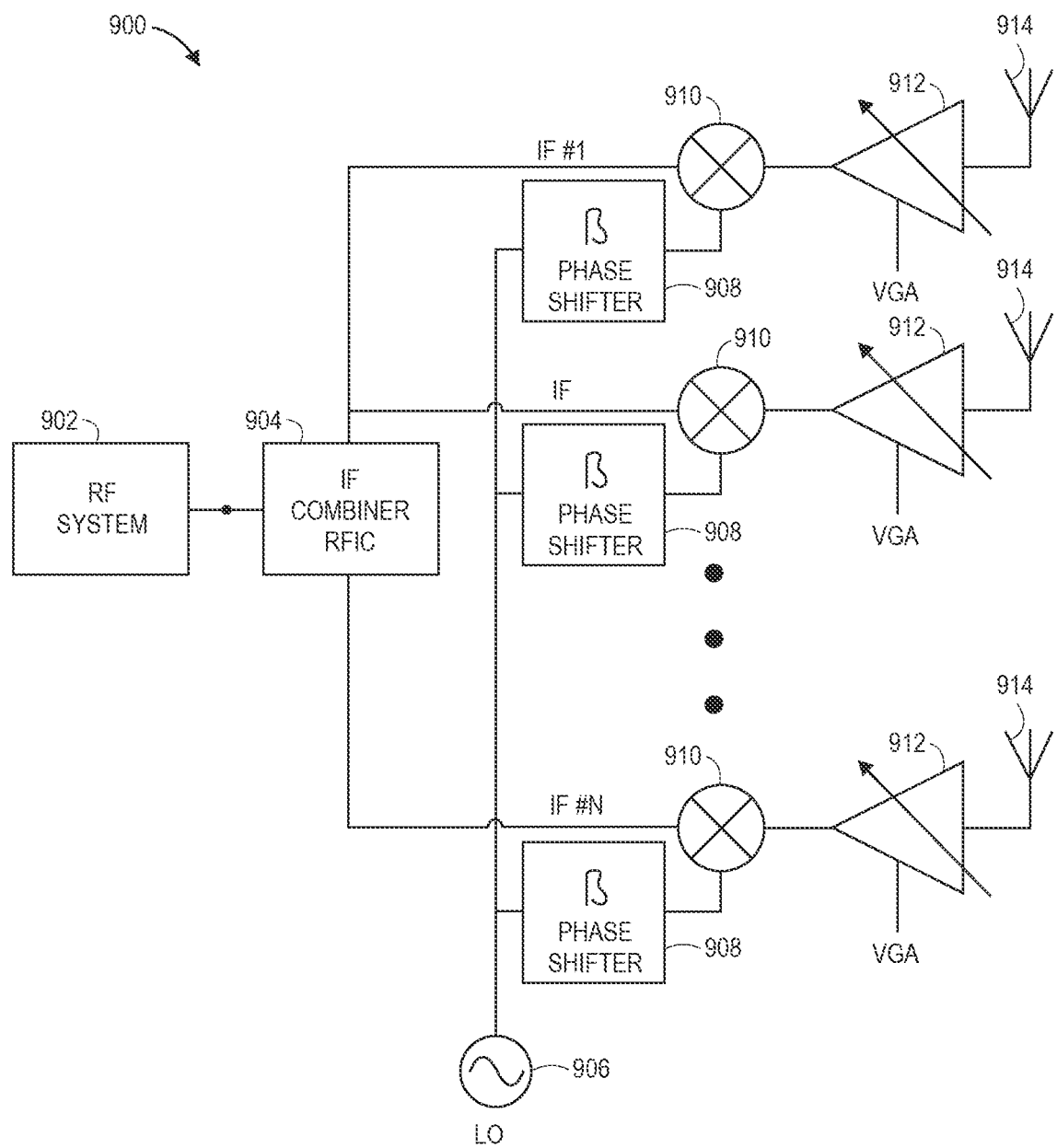
FIG. 9A is a block diagram illustrating a mixer based active electronically scanned array (AESA) architecture with local oscillator (LO) phase shifting, in accordance with one or more embodiments of this disclosure.
Figure 9B:
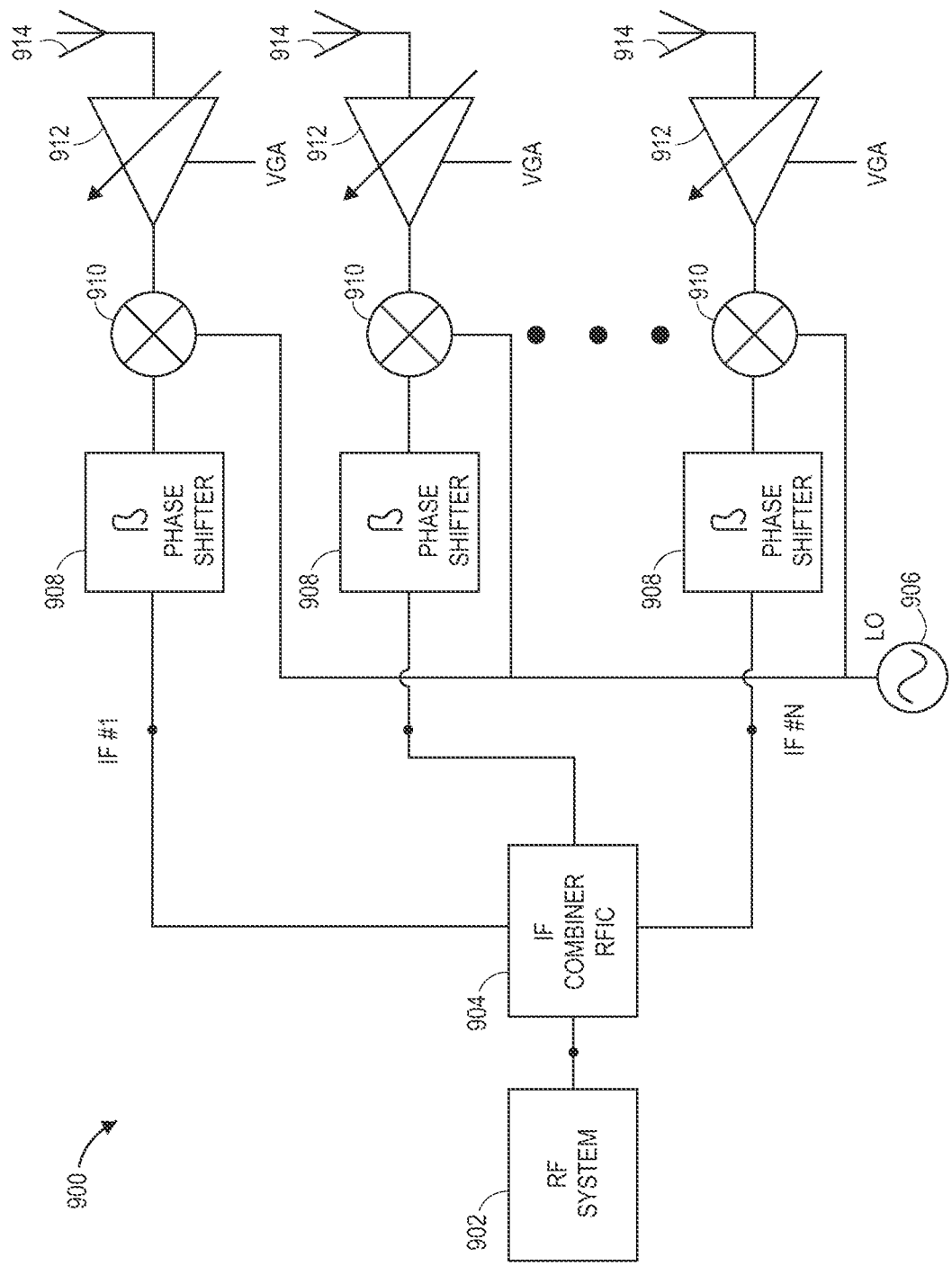
FIG. 9B is a block diagram illustrating a mixer based AESA architecture with intermediate frequency (IF) phase shifting, in accordance with one or more embodiments of this disclosure.
Figure 9C:
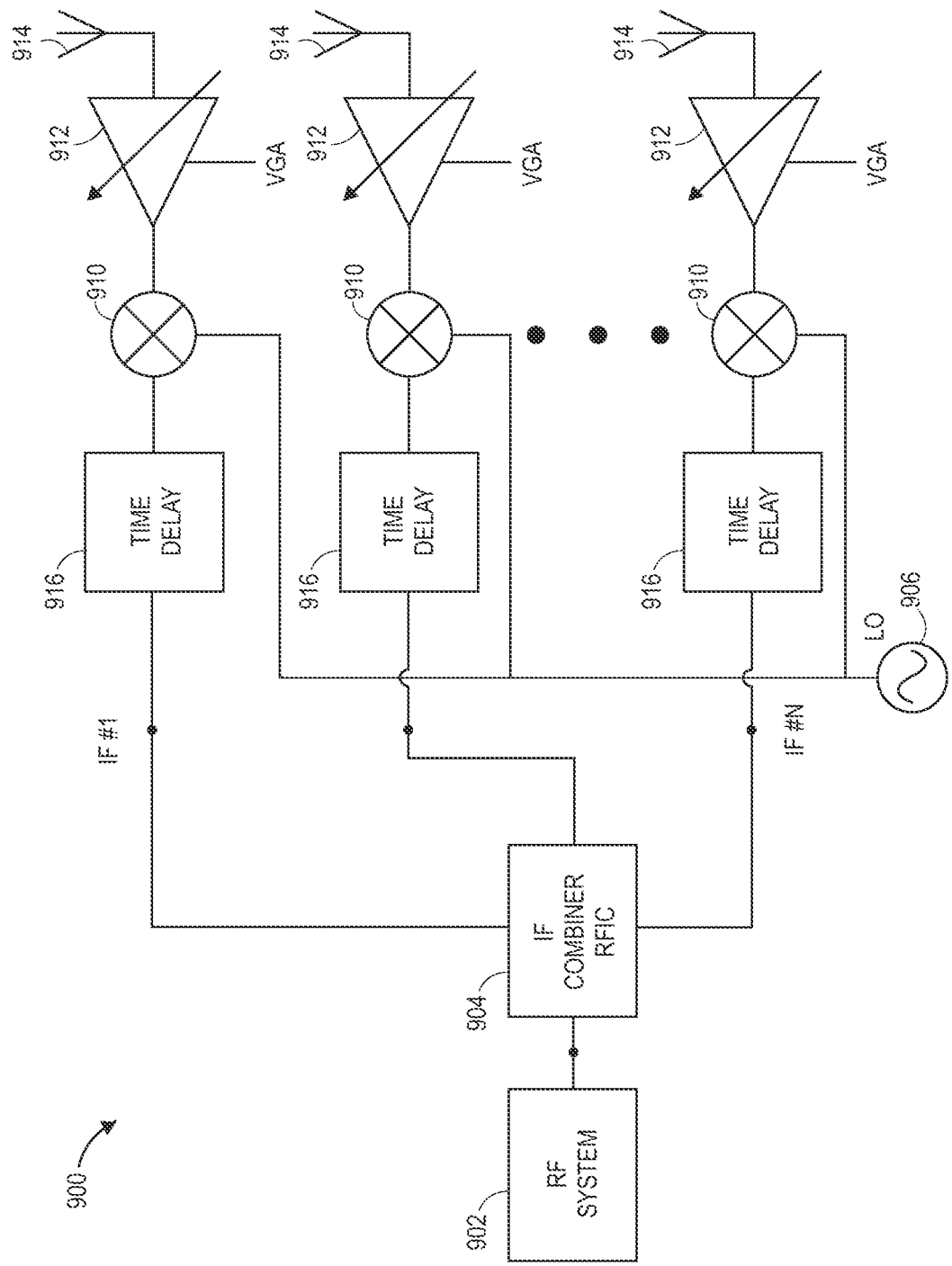
FIG. 9C is a block diagram illustrating a mixer based AESA architecture with intermediate frequency (IF) phase shifting, in accordance with one or more embodiments of this disclosure.

Referring now to FIGS. 9A through 9C, all the previously described BF concepts may be extended to utilize a local oscillator (LO) based of intermediate frequency (IF) based phase shifter within a mixer-based transceiver 900 topology. As shown in FIGS. 9A through 9C, the transceiver 900 may include an RF system input 902 that feeds into an IF combiner Radio Frequency Integrated Circuit (RFIC) 904. The transceiver 900 further includes a LO 906, phase shifters 908 (and/or time delays 916), mixers 910, and VGAs 912. In embodiments where the transceiver is configured for LO based phase shifting (e.g., as shown FIG. 9A), the output signals from the IF combiner RFIC 904 are mixed with phase-shifted LO signals to generate LO based phase shifted output signals that are then gain-adjusted and output via radiating elements 914, or the reverse of these operations when the transceiver 900 is in a receive (Rx) mode. In embodiments where the transceiver is configured for IF based phase shifting (e.g., as shown FIG. 9B or 9C), the output signals from the IF combiner RFIC 904 are phase-shifted (and/or time delayed) and then mixed with LO signals to generate IF based phase shifted output signals that are then gain-adjusted and output via radiating elements 914, or the reverse of these operations when the transceiver 900 is in a receive (Rx) mode. Mixer-based AESA architecture with LO or IF phase shifting may be attractive for mmWave architecture where smaller % bandwidths are still wide instantaneous bandwidths.

Various embodiments of an UWB beam forming system have been described with reference to FIGS. 1A through 9C. However, in other embodiments, the UWB beam forming system may be modified without deviating from the scope of this disclosure. For example, any of the components/subcomponents (e.g., beamformers, TRIUNs, radiating elements or antenna structures, mixers, VGAs, LOs, phase shifters, switches, splitters/combiners, etc.) described herein may be implemented by a plurality of components/subcomponents. In this regard, any reference to "a" or "the" component/subcomponent should be understood as a reference to "one or more" of the same component/subcomponent.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An ultra-wideband (UWB) beam forming system, comprising:
   a plurality of radiating elements forming a circular, cylindrical, conical, spherical, or multi-faceted array; and
   a beamformer including one or more transformable reconfigurable integrated units (TRIUNs) configured to independently control individual radiating elements or groups of radiating elements of the plurality of radiating elements, wherein the plurality of radiating elements arranged in the circular, cylindrical, conical, spherical, or multi-faceted array are one set of multiple sets of radiating elements forming multiple rings with different radii;
   wherein the one or more TRIUNs are configured to generate a directional radiation pattern by turning on a selected group of radiating elements that form an arc of the circular, cylindrical, conical, spherical, or multi-faceted array and turn off other radiating elements that form a remainder of the circular, cylindrical, conical, spherical, or multi-faceted array.

2. The UWB beam forming system of claim 1, wherein the one or more TRIUNs are configured to turn on or off selected radiating elements of a selected set of radiating elements to generate the directional radiation pattern or an omnidirectional radiation pattern emanating from a selected ring of radiating elements with a selected radius.

3. The UWB beam forming system of claim 1, wherein the multiple sets of radiating elements forming the multiple rings are tiered or staggered.

4. The UWB beam forming system of claim 1, wherein the one or more TRIUNs are configured to turn on or off selected radiating elements of the plurality of radiating elements.

5. The UWB beam forming system of claim 1, wherein the one or more TRIUNs are configured to control amplitude parameters for selected radiating elements of the plurality of radiating elements.

6. The UWB beam forming system of claim 1, wherein the one or more TRIUNs are configured to control time delay parameters for selected radiating elements of the plurality of radiating elements.

7. The UWB beam forming system of claim 1, wherein the one or more TRIUNs are configured to control phase parameters for selected radiating elements of the plurality of radiating elements.

8. The UWB beam forming system of claim 1, wherein the one or more TRIUNs are configured to generate an omnidirectional radiation pattern by turning on the plurality of radiating elements and applying different time delays or phase shifts or amplitude adjustments to different radiating elements or groups of radiating elements to produce different omnidirectional wave fronts.

9. The UWB beam forming system of claim 1, wherein the one or more TRIUNs are further configured to generate intra-sector, steered directional radiation patterns by applying different time delays or phase shifts or amplitude adjustments to different radiating elements within the selected group of radiating elements.

10. The UWB beam forming system of claim 1, wherein the one or more TRIUNs are further configured to generate two-dimensional or three-dimensional radiation patterns by turning on one or more radiating elements in at least one other plane than the selected group of radiating elements that form the arc of the circular, cylindrical, conical, spherical, or multi-faceted array.

11. An ultra-wideband (UWB) beam forming system, comprising:
a plurality of radiating elements forming a circular, cylindrical, conical, spherical, or multi-faceted array; and
a beamformer including one or more transformable reconfigurable integrated units (TRIUNs) configured to independently control individual radiating elements or groups of radiating elements of the plurality of radiating elements, wherein the beamformer is configured in a mixer-based transceiver topology with local oscillator (LO) or intermediate frequency (IF) phase shifting; wherein the beamformer includes an IF combiner radio frequency integrated circuit (RFIC); wherein output signals from the IF combiner RFIC are mixed with phase-shifted LO signals to generate LO based phase shifted output signals, wherein the LO based phase shifted output signals are gain-adjusted and output by the plurality of radiating elements.

12. The UWB beam forming system of claim 11, wherein the beamformer is configured to generate an omnidirectional radiation pattern and a directional radiation pattern.

13. The UWB beam forming system of claim 11, wherein the beamformer is configured to generate an omnidirectional radiation pattern and a directional radiation pattern.

14. An ultra-wideband (UWB) beam forming system, comprising:
a plurality of radiating elements forming a circular, cylindrical, conical, spherical, or multi-faceted array; and
a beamformer including one or more transformable reconfigurable integrated units (TRIUNs) configured to independently control individual radiating elements or groups of radiating elements of the plurality of radiating elements, wherein the beamformer is configured in a mixer-based transceiver topology with local oscillator (LO) or intermediate frequency (IF) phase shifting; wherein the beamformer includes an IF combiner radio frequency integrated circuit (RFIC); wherein output signals from the IF combiner RFIC are one or phase shifted or time delayed and then mixed with LO signals to generate IF based phase shifted output signals, wherein the IF based phase shifted output signals are gain-adjusted and output by the plurality of radiating elements.

* * * * *